(12) United States Patent
Längle et al.

(10) Patent No.: US 9,097,911 B2
(45) Date of Patent: Aug. 4, 2015

(54) MICROSCOPE ILLUMINATION

(75) Inventors: Mario Längle, Jena (DE); Matthias Wald, Jena (DE)

(73) Assignee: Carl Zeiss SMS GmbH, Jena (DE)

( * ) Notice: Subject to any disclaimer, the term of this patent is extended or adjusted under 35 U.S.C. 154(b) by 749 days.

(21) Appl. No.: 12/664,289

(22) PCT Filed: May 31, 2008

(86) PCT No.: PCT/EP2008/004350
§ 371 (c)(1),
(2), (4) Date: Apr. 15, 2010

(87) PCT Pub. No.: WO2008/151733
PCT Pub. Date: Dec. 18, 2008

(65) Prior Publication Data
US 2010/0195198 A1    Aug. 5, 2010

(30) Foreign Application Priority Data

Jun. 12, 2007 (DE) .......................... 10 2007 027 083

(51) Int. Cl.
G02B 21/06 (2006.01)
G02B 27/48 (2006.01)
(52) U.S. Cl.
CPC ............... G02B 27/48 (2013.01); G02B 21/06 (2013.01)
(58) Field of Classification Search
CPC ............................................ G02B 21/06–21/14
USPC ..................................... 359/368, 385–389
See application file for complete search history.

(56) References Cited

U.S. PATENT DOCUMENTS

| | | | |
|---|---|---|---|
| 5,796,499 A * | 8/1998 | Wenyon | 359/15 |
| 6,672,739 B1 * | 1/2004 | Argyle et al. | 362/259 |
| 6,717,651 B2 * | 4/2004 | Kato et al. | 355/55 |
| 6,819,490 B2 * | 11/2004 | Sandstrom et al. | 359/566 |
| 7,265,900 B2 * | 9/2007 | Korngut et al. | 359/385 |
| 7,551,261 B2 * | 6/2009 | Fiolka | 355/67 |
| 7,871,164 B2 * | 1/2011 | Luther et al. | 351/205 |
| 2002/0015156 A1 | 2/2002 | Ina et al. | |
| 2002/0067478 A1 * | 6/2002 | Karpol et al. | 356/237.5 |
| 2004/0246574 A1 | 12/2004 | Engel et al. | |
| 2005/0264776 A1 | 12/2005 | Baer | |
| 2006/0221453 A1 | 10/2006 | Koehler et al. | 359/619 |

(Continued)

FOREIGN PATENT DOCUMENTS

| | | | |
|---|---|---|---|
| DE | 3728104 | 3/1989 | G02B 5/04 |
| DE | 10344010 | 4/2005 | G02B 19/00 |

(Continued)

OTHER PUBLICATIONS

International Search Report for International Application No. PCT/EP2008/004350 dated Oct. 23, 2008.

(Continued)

*Primary Examiner* — Stephone B Allen
*Assistant Examiner* — James McGee
(74) *Attorney, Agent, or Firm* — Fish & Richardson P.C.

(57) ABSTRACT

The invention relates to a microscope illumination that includes a laser light source that emits a light beam, beam-guiding optical elements for generating an illumination beam path that includes pupil and field planes, and a homogenizing arrangement for forming a luminous field having a homogenized intensity and configured to be directed onto a sample.

17 Claims, 1 Drawing Sheet

(56) References Cited

U.S. PATENT DOCUMENTS

| | | | |
|---|---|---|---|
| 2007/0024972 A1 | 2/2007 | Kuerz et al. | 359/487 |
| 2007/0058246 A1* | 3/2007 | Westphal et al. | 359/368 |
| 2010/0284024 A1* | 11/2010 | Vucinic et al. | 356/602 |

FOREIGN PATENT DOCUMENTS

| | | | | |
|---|---|---|---|---|
| DE | 10345784 | | 4/2005 | G02B 27/28 |
| DE | 102005014640 | | 10/2006 | G02B 21/06 |
| DE | 102005037764 | A1 * | 2/2007 | |
| DE | 102006030757 | | 2/2007 | G03F 7/20 |
| DE | 102006009212 | A1 * | 8/2007 | |
| DE | 102006035068 | A1 * | 1/2008 | G02B 27/48 |
| WO | WO 2005083512 | A2 * | 9/2005 | |
| WO | WO 2007050743 | A2 * | 5/2007 | |

OTHER PUBLICATIONS

German Search Report, German Application 102007027083.8, 4 pages, Mar. 12, 2008.

* cited by examiner

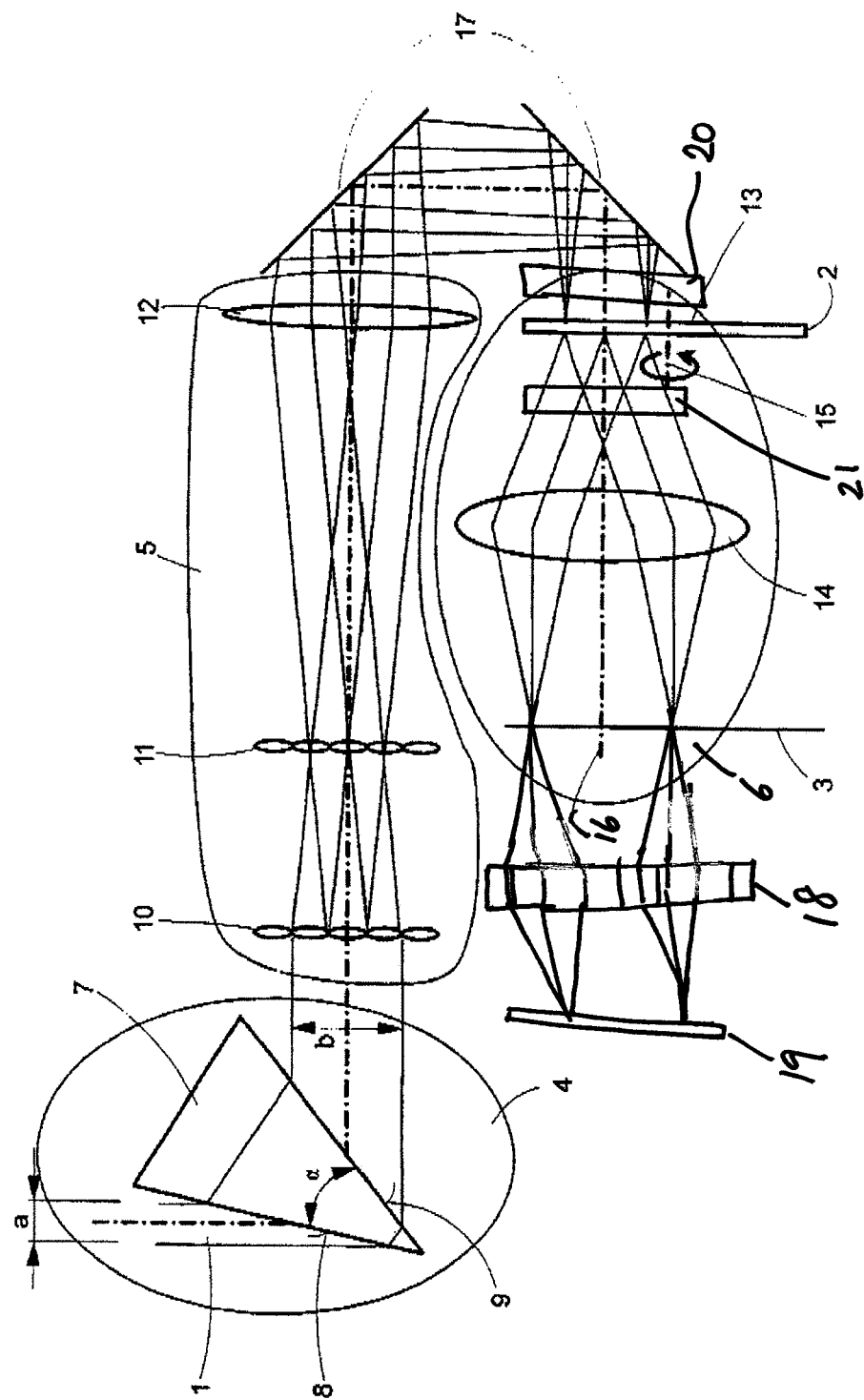

MICROSCOPE ILLUMINATION

This application is the National Stage of International Application No. PCT/EP2008/004350, filed May 31, 2008, which claims priority to German Application No. 10 2007 027 083.8, filed Jun. 12, 2007. The contents of these applications are hereby incorporated by reference in their entireties.

The invention relates to a microscope illumination comprising at least one laser light source that emits a light beam, beam-guiding optical elements for generating an illumination beam path with distinguished planes, such as pupil and field planes, and a homogenizing arrangement for forming a luminous field that is homogenized with respect to the intensity and is to be directed onto a sample to be observed.

Arrangements for homogenizing the radiation intensity within the cross section of a light beam that comes from a laser light source and is provided for illuminating a sample to be examined by microscope are known per se. Such sample illumination is necessary in order to be able to obtain high-quality and high-contrast images of the sample.

It is known, in connection with homogenizing arrangements, to place diffusing screens into the illumination beam path, which admittedly bring about an alternation of the intensity distribution in the sense of homogenization; however, the homogenization is disadvantageously effected with comparatively low efficiency and excessively large light conductance values. Coupling-in aberrations caused by oblique angles of incidence cannot be corrected by means of diffusing screens.

It is likewise known to use diffractive optical elements (DOE) for homogenization purposes, although in this case, too, small light values can only be obtained to an inadequate extent and coupling-in aberrations cannot be avoided or corrected.

Moreover, when rotating diffractive optical elements are used, problems arise in connection with the elevated $0^{th}$ diffraction order of the light since, after the light beam has passed through the diffractive optical element, either said diffraction order lies on the optical axis in the region of the useful orders, such that an averaging of the intensity on the optical axis is not possible without disturbing influence of the $0^{th}$ order, or said order lies on the optical axis while the useful orders lie alongside the optical axis, which results in efficiency losses during homogenization since, after the light beam has passed through a diffractive optical element that has been caused to rotate, the intensity distribution moves around the optical axis.

The latter situation becomes apparent in a disadvantageous manner with regard to the illumination of speckles, in particular, as specific inhomogeneity caused by interference effects of the coherent laser light in the luminous field.

The use of microlens arrays for homogenizing the radiation intensity in the cross section of an illumination radiation path is furthermore known. Disadvantages in this context consist in the fact that, with a microlens array, homogeneously distributed radiation intensity arises only in one of the distinguished planes, either the field plane or the pupil plane, but a parcelled radiation intensity arises in the other plane.

Moreover, the coherence of the laser light also has a disadvantageous effect on the quality of the homogenization.

In the prior art, telescopes are used to adapt the cross-sectional form of the light beam according to the requirements, but the coherence length of the laser light is scaled with the magnification factor in this case.

Proceeding from this prior art, the invention is based on the object of providing a microscope illumination comprising a homogenizing arrangement which, with higher efficiency and quality than in the prior art, achieves a distribution of the light intensity with the inclusion of the $0^{th}$ diffraction order as well as an averaging to the greatest possible extent of the interference effects caused by the coherence of the laser light.

The object is achieved by means of a microscope illumination of the type described in the introduction which, according to the invention, is equipped with a homogenizing arrangement wherein, in a plurality of successive sections of the illumination beam path, optical elements are present which reduce the coherence of the laser light, homogenize the intensity of the light beam in a first distinguished plane of the illumination beam path and furthermore homogenize the intensity of the light beam in a second distinguished plane of the illumination beam path, wherein an optical system for imaging the then homogenized light beam onto the sample is disposed downstream of the homogenizing arrangement.

With a microscope illumination embodied in this way, an illumination beam path is shaped in stages from a light beam that emerges from a laser light source, which illumination beam path, with regard to the form of its cross section and also with regard to the intensity distribution within said cross section, fulfils the object on which the invention is based, and thus meets the requirements of modern microscopy.

One essential advantage of the invention is that the intensity distribution is homogeneous both over the field, that is to say in the field plane, and over the angle, namely in the pupil plane.

In particular configurations of the invention that are described below, a prism is arranged in a first section of the illumination beam path. Light entrance surface and light exit surface of the prism form an angle $\alpha$ with one another, which angle predefines a ratio of light entrance angle and light exit angle by means of which, in the case of a light beam entering with a rectangular cross-sectional form, the short side length of the cross section is extended such that the light beam emerges from the prism again with a substantially square cross section.

At the same time, on account of the dispersion of the material of which the prism is composed, the spectrum of the laser light is fanned out with the extension of the short side length of the light beam cross section and the coherence length is therefore also reduced in this direction of the cross section.

It is also conceivable and lies within the scope of the invention for a plurality of prisms to be provided instead of one prism in said first section in order to achieve the above-described effects of changing the cross section and reducing the coherence.

As an alternative to the use of prisms in said first section of the illumination beam path, the use of one or a plurality of optical gratings is also conceivable, in principle. However, it is difficult in this case to achieve the same efficiency in the case of the beam expansion and coherence reduction.

In a second section of the illumination beam path, the homogenizing arrangement has optical elements for homogenizing the intensity of the light beam in the first distinguished plane, for example a pupil plane. For this purpose, at least one micro-optically active element and also a converging lens disposed downstream of said micro-optically active element are provided, said converging lens imaging the far field of the micro-optically active element into its image-side focal plane.

In one particularly advantageous configuration, which is explained in greater detail further below on the basis of an exemplary embodiment, two microlens arrays as micro-optically active elements and also the converging lens are provided successively in the direction of the illumination beam path and are positioned at distances from one another such that the second microlens array and the converging lens image the first microlens array into the first distinguished plane, for example into the pupil plane.

What is advantageously achieved in this way is that inhomogeneities caused by diffraction or oblique angles of incidence are corrected.

Furthermore, in this case no $0^{th}$ diffraction order arises and very small light values are obtained given appropriately embodied geometry of the microlens arrays. Since the light conductance value of a microscope is very small, it is not expedient to offer a large light conductance value since the latter would be trimmed in one of the distinguished planes of the microscope, which would lead to the loss of light and to the reduction of the efficiency.

It is recommendable in this context to embody the microlens arrays such that the individual lenses have a radius of curvature R=28 mm, a diameter (pitch) of 300 µm and a focal length of f=50 mm.

In this case, the light conductance value corresponds to the product of the lateral extent of the illuminated field and the maximum angle at which this field is illuminated.

A further advantage of the small light conductance value in the course of the homogenization in the second section of the illumination beam path results from the avoidance of large angles at the entrance to a third section—provided according to the invention—of the illumination beam path, said third section comprising optical elements for homogenizing the intensity of the light beam in a second distinguished plane of the illumination beam path, for example in a field plane.

In this case, the entrance angle spectrum from the second section is convolved with the diffraction angle spectrum from said third section. Small entrance angles bring about at this point the avoidance of a rounded intensity profile in the second distinguished plane.

A diffractive optical element (DOE) and a converging lens disposed downstream of said diffractive optical element are advantageously provided as optical elements for homogenizing the intensity of the light beam in the second distinguished plane, wherein the converging lens images the far field of the DOE into its image-side focal plane. In this case, the intensity distribution in the image-side focal plane corresponds to the intensity distribution such as arises at infinite distance from the DOE.

The diffractive optical element is positioned in the vicinity of the first distinguished plane, wherein the intensity has already been made more uniform by the optical elements in the second section of the homogenizing arrangement. Vicinity in this context is deemed to be a distance from the first distinguished plane in the range of ±1 Rayleigh length.

The diffractive optical element is caused to rotate about a rotation axis oriented parallel to the optical axis of the illumination beam path, such that on account of this rotation, after the light beam has passed through the diffractive optical element, inhomogeneities that still exist are eliminated to the greatest possible extent.

It is particularly advantageous if a wedge plate, which is likewise caused to rotate, is disposed upstream of the diffractive optical element. In this case, the rotation direction and the rotation speed of the wedge plate should correspond to the rotation direction and rotation speed of the diffractive optical element.

On account of the common rotation of the diffractive optical element and of the wedge plate, the light field rotates about the optical axis, whereby the $0^{th}$ diffraction order, which arises when the light beam passes through the diffractive optical element, is separated from the useful orders likewise formed.

With this configuration of the microscope illumination according to the invention, wherein the diffractive optical element and the wedge plate interact, in a particularly effective manner an averaging of interference effects such as speckles is obtained and a decrease in the radiation intensity toward the periphery of the light beam cross section is compensated for.

An additional advantage is afforded here insofar as the useful orders of the diffractive optical element lie on the optical axis, which fits in with adjusting the optical axis by changing the position of optical elements, such as lenses and mirrors, in the further beam path.

The diffractive optical element can preferably be embodied as a quartz plate structured on the light exit surface. The use of a computer generated hologram (CGH) as a specific embodiment of the diffractive optical element is conceivable and included in the concept of the invention.

In a further-reaching configuration of the arrangement according to the invention, a reflecting prism that rotates about the optical axis of the illumination beam path can be disposed upstream or downstream of one of the distinguished planes, i.e. the pupil plane or the field plane. In this case, the reflecting prism should have a hypotenuse surface oriented parallel to the optical axis of the illumination beam path, such that with the rotation of the reflecting prism, the imaging of the laser light source that is generated by said prism rotates at doubled angular velocity, which, on account of the rotational symmetry thus produced, leads to a homogenization to the greatest possible extent of the intensity distribution in the cross section of the luminous field.

It is recommendable in this regard to arrange a rotating Dove prism between the pupil plane and the converging lens disposed downstream of the pupil plane in the third section.

The invention will be explained in greater detail below on the basis of an exemplary embodiment.

FIG. 1 is used for explanation purposes.

FIG. 1 indicates a light beam 1 coming from a laser light source (not illustrated in the drawing), said light beam being provided for illuminating a sample when the latter is observed by means of a microscope device. In this respect, optical elements are provided which shape the light beam 1 to form an illumination beam path with distinguished planes, such as, for example, a pupil plane 2 and a field plane 3.

Optical elements for shaping illumination beam paths and for forming distinguished planes in illumination beam paths are sufficiently known from the prior art, and so a more detailed explanation can be dispensed with here.

Accordingly, only the pupil plane 2 and field plane 3 formed by means of said optical elements are indicated in FIG. 1. In this case, in the direction of progression of the illumination beam path, the field plane 3 is disposed downstream of the pupil plane 2. Downstream of the field plane 3, optical elements for imaging the light beam onto the sample or for generating a luminous field on the sample are provided, which are in turn known per se from the prior art and are not illustrated here in the drawing.

A prerequisite for obtaining a high-contrast imaging of the illuminated sample region or for obtaining a high imaging quality is a luminous field which is directed with intensity homogenized to the greatest possible extent onto the sample to be observed.

In this respect, the microscope illumination according to the invention comprises a homogenizing arrangement which, in three successive sections 4, 5 and 6 of the light beam 1 shaped to form an illumination beam path, comprises optical elements which reduce the coherence of the laser light, homogenize the intensity of the laser beam in a first distinguished plane, here for example in the pupil plane 2, and homogenize the intensity of the laser light in a second distinguished plane, here for example in the field plane 3.

Firstly, in the direction of progression of the light beam 1, a first section 4 is provided, which has a prism 7, the light entrance surface 8 and light exit surface 9 of which form an angle α with one another. It should be assumed that the light beam 1 has a rectangular cross section upon entering into the light entrance surface 8, where the smaller side length a is intended to lie in the plane of the drawing in FIG. 1.

Proceeding from this, the angle α should be dimensioned such that the original side length a has been extended to a side length b after the light beam has emerged from the light exit surface 9, and it should be assumed that the side length b also corresponds to the extent of the cross section perpendicular to the plane of the drawing, such that the light beam 1 now has a square cross section. This is achieved in a manner dependent on the refractive index of the prism material for example at an angle α=70°.

When the light beam 1 passes through the prism 7, moreover, the coherence of the laser light is reduced in a manner dependent on the dispersion of the material of which the prism is composed. This coherence length reduction brings about an incoherent superimposition of the partial waves of the subapertures of the homogenization in section 5, whereby an important prerequisite is fulfilled for the homogenization of the radiation intensity in the first distinguished plane, which is a pupil plane 2 in the exemplary embodiment chosen here.

Two microlens arrays 10 and 11 and a converging lens 12 disposed downstream of the microlens arrays 10 and 11 are provided in section 5.

Microlens arrays 10 and 11 and converging lens 12 are positioned with respect to one another such that the second microlens array 11 and the converging lens 12 image the first microlens array 10 into the first distinguished plane, here the pupil plane 2.

By virtue of the fact that the converging lens 12 images the far field of the two microlens arrays 10, 11 into its image-side focal plane, in this case into the pupil plane 2, a homogenization of the radiation intensity of the light beam 1 in the pupil plane 2 is achieved.

Inhomogeneities caused by diffraction or oblique angles of incidence are corrected in this case. Furthermore, in this case no $0^{th}$ diffraction order arises, and very small light values are obtained if the individual lenses of the microlens arrays 10, 11 are embodied for example with a radius of curvature R=28 mm, a pitch of 300 μm and a focal length f=50 mm.

Large angles at the entrance to the next section 6 of the illumination beam path can advantageously be avoided in this way. Optical elements for homogenizing the intensity of the light beam in a second distinguished plane, that is the field plane 3 in the exemplary embodiment chosen here, are present in the section 6.

The pupil plane 2 simultaneously forms the entrance to the section 6 of the illumination beam path. As optical elements for homogenization, the section 6 has a diffractive optical element 13 and a converging lens 14 disposed downstream of the diffractive optical element 13. The diffractive optical element 13 is caused to rotate about a rotation axis 15 oriented parallel to the optical axis 16 of the light beam 1 and thus of the illumination beam path.

The converging lens 14 images the far field of the micro-optically active element into its image-side focal plane, which corresponds to the second distinguished plane, the field plane 3 in the example chosen. A homogenization to the greatest possible extent of the intensity in the field plane 3 is thus obtained.

In this case, the entrance angle spectrum from the section 5 is convolved with the diffraction angle spectrum from the section 6 and an otherwise disadvantageously rounded intensity profile in the second distinguished plane, the field plane 3, is thereby avoided.

An imaging system 18, downstream of the field plane 3 images the homogenized light distribution as a luminous field into the sample plane and thus onto a sample 19 positioned in said plane.

Optionally, a wedge plate 20 that is likewise caused to rotate about the optical axis 16 of the illumination beam path can be disposed upstream of the diffractive optical element 13, wherein the rotation direction and the rotation speed of the wedge plate 20 preferably correspond to the rotation direction and the rotation speed of the diffractive optical element 13.

What is thus achieved is that the useful orders of the light diffracted at the diffractive optical element 13 are formed around the optical axis 16, while the $0^{th}$ diffraction order lies in a manner separated from the useful orders outside the optical axis.

On account of this separation of the $0^{th}$ order from the useful orders, in comparison with known technical solutions wherein a diffractive optical element is used for homogenization purposes, the $0^{th}$ order is avoided in the field used.

Optionally, a reflecting prism that rotates about the optical axis of the illumination beam path can furthermore be disposed upstream or downstream of one of the distinguished planes. In this case, the reflecting prism is preferably embodied as a Dove prism 21 and positioned between the pupil plane 2 and the converging lens 14.

The optical deflection element 17 in FIG. 1 serves only for beam guidance, for beam deflection in the exemplary embodiment described here, and has no functional importance with regard to the homogenization.

LIST OF REFERENCE SIGNS

1 Light beam
2 Pupil plane
3 Field plane
4, 5, 6 Sections
7 Prism
8 Light entrance surface
9 Light exit surface
10, 11 Microlens arrays
12 Converging lens
13 Diffractive optical element
14 Converging lens
15 Rotational axis
16 Optical axis
17 Optical deflection element
a, b Side lengths
α Angle

The invention claimed is:
1. An apparatus for microscope illumination, the apparatus comprising:
 a laser light source that emits a light beam,
 beam-guiding optical elements for generating an illumination beam path, the illumination beam path comprising pupil and field planes, and
 a homogenizing arrangement for forming a luminous field having a homogenized intensity and configured to be directed onto a sample, optical elements disposed downstream of the homogenizing arrangement configured to image the homogenized light beam onto the sample, and a first microlens array and a second microlens array, wherein the second microlens array is configured to image the first microlens array into the pupil plane;

wherein:

the homogenizing arrangement comprises optical elements in a first section which reduce a coherence length of the light beam emitted from the laser light source, optical elements in a second section which homogenize the intensity of the light beam in a first plane and optical elements in a third section which homogenize the intensity of the light beam in a second plane, the first plane is different from the second plane, when the first plane is a pupil plane, the second plane is a field plane, the homogenizing arrangement comprises a micro-optically active element and a converging lens disposed downstream of the micro-optically active element configured to homogenize the intensity of the light beam in the pupil plane, and the optical elements in the third section comprise a diffractive optical element and a converging lens disposed downstream of the diffractive optical element, the first plane being disposed between the second section and the third section, and the converging lens is configured to image a far field of the diffractive optical element onto the second plane.

2. The apparatus according to claim 1, wherein the diffractive optical element is positioned within a Rayleigh length of the first plane.

3. The apparatus according to claim 1, wherein the diffractive optical element is positioned within a Rayleigh length of the first plane, the first plane having an intensity that has been made more uniform by the optical elements in the second section of the homogenizing arrangement.

4. The apparatus according to claim 1, wherein a far field of the diffractive optical element is configured to be imaged onto an image-side focal plane of the converging lens.

5. The apparatus of claim 1, wherein homogenizing the intensity of the light beam in the first plane comprises superimposing partial waves of the light beam in the first plane across the illuminated portion of the first plane.

6. The apparatus according to claim 4, wherein the first plane is a pupil plane.

7. The apparatus according to claim 4, the second plane is a field plane.

8. The apparatus according to claim 4, wherein the homogenizing arrangement comprises a prism in the first section, a light entrance surface and a light exit surface of the prism form an angle $\alpha$ with one another, wherein an emerging light beam has a substantially square cross section, and a coherence length of the emerging light beam is reduced on account of a dispersion of a prism material.

9. The apparatus according to claim 8, wherein the first plane is a pupil plane.

10. The apparatus according to claim 8, wherein the second plane is a field plane.

11. The apparatus according to claim 8, wherein a reflecting prism that rotates about an optical axis of the illumination beam path is disposed upstream or downstream of the first plane or the second plane, said prism having a hypotenuse surface oriented parallel to the optical axis of the illumination beam path.

12. The apparatus according to claim 4, wherein the diffractive optical element is positioned in a pupil plane.

13. The apparatus according to claim 4, wherein the diffractive optical element is rotatable about a rotation axis parallel to an optical axis of the illumination beam path.

14. The apparatus according to claim 13, wherein a wedge plate, which is rotatable about a rotation axis, is disposed upstream of the diffractive optical element.

15. The apparatus according to claim 14, wherein the wedge plate and the diffractive optical element are configured such that a rotation direction and a rotation speed of the wedge plate correspond to a rotation direction and a rotation speed of the diffractive optical element.

16. The apparatus according to claim 4, wherein a reflecting prism that rotates about an optical axis of the illumination beam path is disposed upstream or downstream of a pupil plane or a field plane, said prism having a hypotenuse surface oriented parallel to the optical axis of the illumination beam path.

17. The apparatus according to claim 16, wherein a rotating Dove prism is provided between the pupil plane and a converging lens.

\* \* \* \* \*